United States Patent
Kryder et al.

[11] Patent Number: 6,011,664
[45] Date of Patent: Jan. 4, 2000

[54] TECHNIQUES FOR ULTRAHIGH DENSITY WRITING WITH A PROBE ON ERASABLE MAGNETIC MEDIA

[75] Inventors: Mark Howard Kryder, Bradford Woods; Stanley H. Charap, Pittsburgh, both of Pa.

[73] Assignee: Carnegie Mellon University, Pittsburgh, Pa.

[21] Appl. No.: 08/521,972

[22] Filed: Aug. 31, 1995

[51] Int. Cl.$^7$ ............... G11B 5/02; G11B 9/00; G01R 33/00; G01N 27/82
[52] U.S. Cl. ............ 360/59; 369/126; 324/203; 324/213
[58] Field of Search ............ 360/59, 66; 324/203, 324/205, 213; 369/128, 126; 365/151; 250/306, 307

[56] References Cited

U.S. PATENT DOCUMENTS

| | | | |
|---|---|---|---|
| 4,792,788 | 12/1988 | Kumar | 341/15 |
| 4,878,213 | 10/1989 | Kazan et al. | 369/126 |
| 5,313,164 | 5/1994 | Starewitcz et al. | 324/318 |
| 5,329,122 | 7/1994 | Sakai et al. | 369/126 |
| 5,375,087 | 12/1994 | Moreland et al. | 365/151 |
| 5,388,019 | 2/1995 | Argyle et al. | 360/126 |
| 5,418,029 | 5/1995 | Yamamoto et al. | 428/64 |
| 5,431,055 | 7/1995 | Takata et al. | 73/618 |
| 5,444,191 | 8/1995 | Yamamoto et al. | 178/18 |
| 5,461,605 | 10/1995 | Takimoto et al. | 369/128 |
| 5,486,956 | 1/1996 | Urata | 360/46 |
| 5,615,192 | 3/1997 | Kikukawa et al. | 369/59 |
| 5,721,721 | 2/1998 | Yanagisawa et al. | 369/47 |

OTHER PUBLICATIONS

O. Watanuki, et al., Small Magentic Patterns Written With A Scanning Tunneling Microscope, pp. 5289–5291 IEEE Transactions on Magnetics, vol. 27, Nov. 1991.

J. O. Artman, et al., Microwave Generation Of Bubble Domains In Magnetic Thin Films, IEEE Transactions on Magnetics, vol. Mag 19, No. 5, pp. 1814–1816 (1983).

J. L. Dong, et al., The Investigation Of The Process Of Microwave Bubble Generation In A Bubble Material, J. Appl. Phys. 63(9), pp. 4609–4615 (1988).

R. E. Betzig, et al., Near–Field Magneto Optic And High Density Data Storage, Applied Physics Letters, vol. 61(2) pp. 142–144 (1992).

Magnetic Recording Handbook, Mee et al, pp. 836–837, 1990.

*Primary Examiner*—Andrew L. Sniezek
*Assistant Examiner*—Regina Y. Neal
*Attorney, Agent, or Firm*—Kirkpatrick & Lockhart LLP

[57] ABSTRACT

Techniques for ultrahigh density writing on an erasable magnetic medium include using a micromachined mechanism having two probes for writing to the medium. Use of the two probe embodiment eliminates the need to change the magnetic orientation of the probe. In another embodiment, a single probe is provided which is heated to the vicinity of its Curie temperature to enable the magnetic orientation of the probe to be switched. The probe may be heated to its Curie temperature through the use of a heating element or a focused laser. In another embodiment of the present invention, either the magnetic orientation of the probe or the magnetic orientation of the medium may be switched through the combination of a static magnetic field, a radio frequency magnetic field and, under certain circumstances, the magnetic field of the probe. In all cases, the writing techniques enable information to be written to a magnetic medium in a manner which enables the information to be erased and the medium rewritten.

18 Claims, 3 Drawing Sheets

TECHNIQUES FOR ULTRAHIGH DENSITY WRITING WITH A PROBE ON ERASABLE MAGNETIC MEDIA

BACKGROUND OF THE INVENTION

1. Field of the Invention

The present invention is directed broadly to micromachined memory devices and more particularly to techniques for ultrahigh density writing with a micromachined probe on an erasable magnetic medium.

2. Description of the Background

The invention of various scanning probe microscopy technologies has made possible the development of ultrahigh density data storage technologies based upon them. The use of an atomic force microscope for recording and playing back topographical features in a plastic substrate has been demonstrated. Such scanning probe storage technologies make possible exceedingly high storage densities in the $10^{10}$ to $10^{12}$ bits/in$^2$ range. Most of the proposed methods of storage which have been investigated using those techniques utilize write-once technologies in which it is possible to write-once on the storage medium and read it back repeatedly. Whereas such write-once technology does have applications, it is desirable to have storage technologies which provide the capability to write, erase, and rewrite information repeatedly.

Magnetic storage media such as those used in magnetic and magneto-optic disk and tape drives are known to be writable, erasable, and rewritable using magnetically switchable magnetic recording heads. However, when the head dimensions become small compared to the distance over which exchange energy tightly couples the magnetization, the magnetization in the head assumes a single domain state and becomes very difficult to switch. In such circumstance, to switch the magnetization in the head, it becomes necessary to overcome the shape anisotropy of the head. A long wire-like probe head would, for example, require a field equal to $0.5\,M_s$ to switch its magnetization. For a typical soft magnetic material such as Permalloy, a field of 400 KA/m is required, which is much too large to generate with a coil wound around the probe. Because switching the magnetization of a ferromagnetic probe tip directly by an applied magnetic field generated by a current does not appear to be viable, other means of switching must be developed.

One writing technique which has already been demonstrated to work at densities approaching 100 Gbit/in$^2$ is to use heat generated by laser light coupled into an optical fiber, which has been tapered to a very small aperture at the end, to raise the temperature of a small region of a magnetic thin film above its Curie temperature in the presence of a magnetic field. R. E. Betzig, et al., "*Near-Field Magneto Optic and High Density Data Storage*", Applied Physics Letters, Vol. 61(2), p. 142–144 (1992). When the film cools down after the laser energy is removed, its magnetization assumes the direction of the externally applied magnetic field. That thermomagnetic recording technique was demonstrated through joint work of researchers at AT&T Bell Laboratories and Carnegie Mellon University to be capable of recording 60 nm diameter domains on 120 nm diameter center-to-center spacing, or a density of about 45 Gbit/in$^2$. Higher densities might have been achievable, but the roughness of the film prevented the researchers from bringing the tip closer to the medium.

Another technique is to use magnetic resonance phenomena to switch the magnetization of either a selected bit in the medium or of the probe head itself. Artman and Charap studied the use of ferromagnetic resonance to nucleate domains in garnet materials several years ago at Carnegie Mellon University. J. O. Artman, et al., "*Microwave Generation of Bubble Domains in Magnetic Thin Films*". IEEE Transactions on Magnetics, Vol. Mag 19, No. 5, p. 1814–1816 (1983); J. L. Dong, et al., "*The Investigation of the Process of Microwave Bubble Generation in a Bubble Material*", J. Appl. Phys. 63(9), p. 4609–4615 (1988). They showed that by applying a magnetic field to a magnetic material and driving the material sufficiently hard with a radio frequency field tuned to the resonant frequency at which the spins precessed, the precession could be made sufficiently large in amplitude to cause the magnetization in the material to switch from one orientation to another. To write using a magnetic probe head using that technique, one can apply a radio frequency field to a magnetic medium at a frequency which is close to the resonant frequency of the medium and use the localized field generated by a magnetic probe head to tune the resonant frequency of a selected bit location to that of the applied radio frequency field, causing it to switch magnetization orientations. Despite that work, the need still exists for techniques that allow for the ultrahigh density writing with a probe on an erasable magnetic medium which are easy to implement with existing technologies, reliable, and fast.

SUMMARY OF THE INVENTION

The present invention is directed to several techniques for ultrahigh density writing with one or more probes on an erasable magnetic medium. According to one embodiment of the invention, the problems associated with having to switch the magnetic orientation of the probe are eliminated by providing two permanently magnetized probes. One magnetic probe for writing information to the medium is permanently magnetized in a first direction while a second magnetic probe for writing information to the medium is permanently magnetized in a second direction. Each probe is provided with its own driver for positioning the probe in the x, y, and z directions with respect to the medium. Each of the probes is provided with feedback circuits for providing feedback to the probe's driver to ensure proper positioning of the probe with respect to the medium.

According to another embodiment of the present invention, a single probe is provided which has a tip for writing information to the medium. An x-y-z-driver is provided for positioning the probe with respect to the medium. Feedback circuits are provided to ensure that the probe is positioned properly with respect to the medium. A wire coil is positioned on the probe. Electrical current is supplied to the coil in a manner to enable the coil to heat the tip of the probe to the vicinity of its Curie temperature. After the tip of the probe has been heated to the vicinity of its Curie temperature, the current flowing through the wire coil may be controlled so as to define the magnetic orientation of the probe. Alternatively, a separate loop of wire may be provided on the probe which is used to establish the magnetic orientation of the probe after the Curie temperature has been reached.

In yet another embodiment of the present invention, a magnetized probe generating a probe field and having tip for writing information to the medium is provided. An x-y-z-driver is provided for positioning the probe with respect to the medium. Feedback circuits are provided to control the position of the tip of the probe relative to the medium. A static magnetic field is provided at least in the area of the medium to be written. A radio frequency magnetic field is provided at a selected frequency at least in the area of the medium to be written. The combination of the probe field, the static field, and the radio frequency field is sufficient to allow information to be written to the medium. In an alternative embodiment, the static field and radio frequency field are combined in a manner to determine the orientation of the probe field. After the orientation of the probe field has been established, the probe field is used to write information to the medium.

The writing techniques of the present invention provide substantial advances not found in the art. All of the embodiments of the present invention can be fabricated using standard, state of the art fabrication techniques. All of the embodiments of the present invention allow for ultrahigh density writing of information to a magnetic medium in a manner which allows the medium to be erased and rewritten. Those and other objectives and benefits of the present invention will become apparent from the Description Of The Preferred Embodiments hereinbelow.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Figure 1:
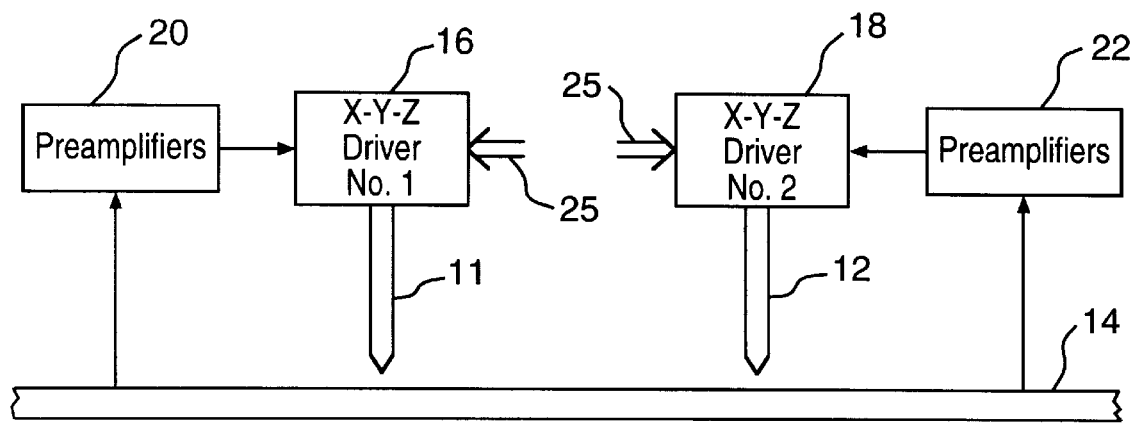
FIG. 1 illustrates a two probe writing embodiment constructed according to the teachings of the present invention.

One method, which circumvents the problem of having to switch the magnetic orientation of the probe, is to use two permanently magnetized probes 11, 12 for recording on a magnetic recording medium 14 as shown in FIG. 1. One of the probe heads 11 could be permanently magnetized upward while the other probe head 12 could be permanently magnetized downward. Depending upon whether one wished to magnetize a specific bit cell (not shown in FIG. 1) in the medium 14 up or down, the probe head 11 would be moved to the selected location by a first x-y-z-driver 16 while the probe head 12 would be moved to the selected location by a second x-y-z-driver 18. Each of the drivers 16, 18 is responsive to control signals 25 generated in a known manner.

A first feedback circuit including preamplifiers 20, is provided to ensure proper positioning of the probe 11 with respect to the x, y, and z directions. For example, one of the preamplifiers 20 may be responsive to the tunneling current produced by probe 11 to control the spacing between the probe 11 and the medium 14. Other types of feedback could be used to control positioning in the z direction. A second feedback circuit including preamplifiers 22 is similarly provided to ensure proper positioning of the second probe in the x, y, and z directions. For example, one of the preamplifiers 22 may be responsive to the tunneling current produced by probe 12 to control the spacing between the probe 12 and the medium 14. With that configuration, fields generated by permanently magnetized probes 11, 12 approaching the saturation magnetization of the probes 11, 12 can be achieved in close proximity to the tip of probes 11, 12. Fields of the order of 10–20 kGauss are possible.

If the medium contains bit cells, the cross-section of probes 11, 12 should be chosen to correspond approximately to the lateral dimensions of the bit cells, whereas the length could be chosen to determine the rate at which the field decreases as the tip is drawn away from the medium 14. With relatively short probes 11, 12, it would be necessary to move the probes only a fraction of a micrometer from the medium 14 surface to lower the field by more than one order of magnitude.

The use of two probe heads 11, 12 for writing to the medium 14 has some drawbacks. Mechanically raising and lowering two independent probe tips in the z direction, although certainly possible with micromachined structures, could be relatively slow and therefore might limit the rate at which data may be written. At the minimum, it appears that the use of two independent probe tips would halve the writing frequency and double the number of actuators required to position the tips. In addition, although with the probe in contact with the medium, the resolution of the probe would approach the probe cross-section, as the probe is drawn away, the resolution would degrade as the field gradually decreased. With defined bit cells in a structured medium, that might not be a problem, but it is possible that there might be some interference with adjacent bits or that the written bit might be variable in size if a continuous medium were used.

Figure 2:
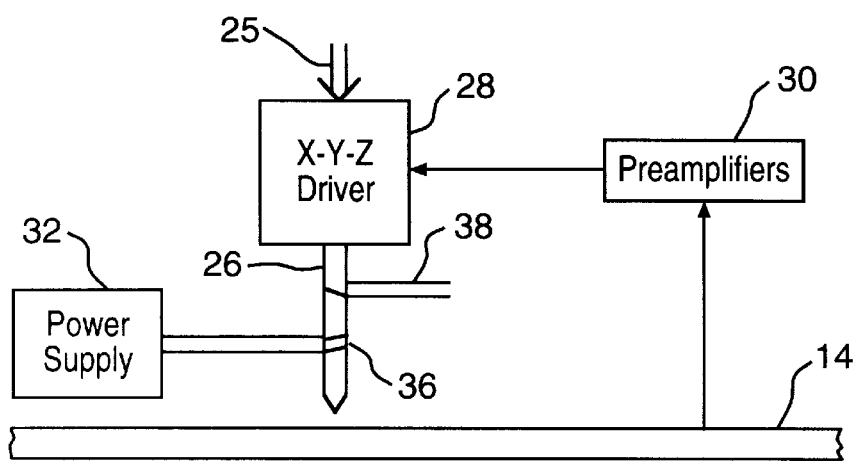
FIG. 2 illustrates a single probe writing embodiment constructed according to the teachings of the present invention in which thermal energy is used to help switch the magnetic orientation of the probe.

The problems associated with the two probe embodiment illustrated in FIG. 1 can be overcome if the problems associated with having to switch the magnetic orientation of the probe can be overcome. One approach to switching the magnetic orientation of a single write probe is illustrated in FIG. 2. In FIG. 2, a magnetic probe write head 26 is responsive to an x-y-z-driver 28 which is itself responsive to control signals 25. A feedback circuit including preamplifiers 30 provides signals for the purpose of properly positioning the probe 26.

Unlike the prior art where thermal energy is used to directly assist in switching the magnetization of the recording medium 14, thermal energy may be used to help switch the magnetic orientation of the probe head 26. The thermal energy is generated by a power supply 32 which outputs current through a heating element 36 located on or near the tip of the probe 26. The heating element 36 should have a sufficient resistance to provide the necessary $I^2R$ heating to heat the probe to the vicinity of its Curie temperature. The necessary resistance can be obtained either through the selection of a material having a high resistance, the cross-section of the coil, or some combination of the two. Any type of heating element will suffice. The probe could alternatively be heated by other techniques such as pulsed laser light.

Although the Curie temperatures of most strongly ferromagnetic materials such as Ni, Fe, and Co or their alloys are too high to be reached in a practical device structure, a number of ferrimagnetic materials and multilayer materials do have Curie temperatures of the order of 200–300° C., which can be reliably achieved over the small magnetic volume of the tip of probe head 26. For example, Co/Pt multilayer films consisting of 0.4 nm layers of Co separated by 1 nm of Pt are known to have a Curie temperature of about 300° C. and an effective average saturation magnetization of about 400 kA/m. A magnetic probe head 26 having dimensions of the order of 40 nm×40 nm×0.5 micrometer on a substrate having moderate thermal conductivity such as glass, requires a power of 10 mW for only a few nanoseconds to heat the head to 300° C. By carefully selecting the thermal properties of the substrate, the thermal time constant for cooling the probe 26 can be made to be of the order of 10–100 nsec, making possible high data rate recording. The magnetic field generated by such a probe approaches 400 kA/m in close proximity to the probe tip and is adequate to switch the magnetization of extremely small magnetic bits in either high coercivity continuous thin films or isolated magnetic particles.

The magnetization state of the probe after it cools down can be controlled by a relatively small magnetic field generated by a current loop 38 or the field generated by the current is the heating element 36. The field magnitude needs to be large enough to overcome only ambient stray fields. The polarity of the current used to raise the temperature of the probe can be used to determine the remanent state of the probe 26. If the current is initially at a sufficiently high value to heat the probe beyond its Curie temperature, it can later be ramped down to lower values at which the probe becomes magnetized in the direction determined by the field from the current. Thus, only two wires are required to switch the magnetization of the magnetic probe.

Figure 3:
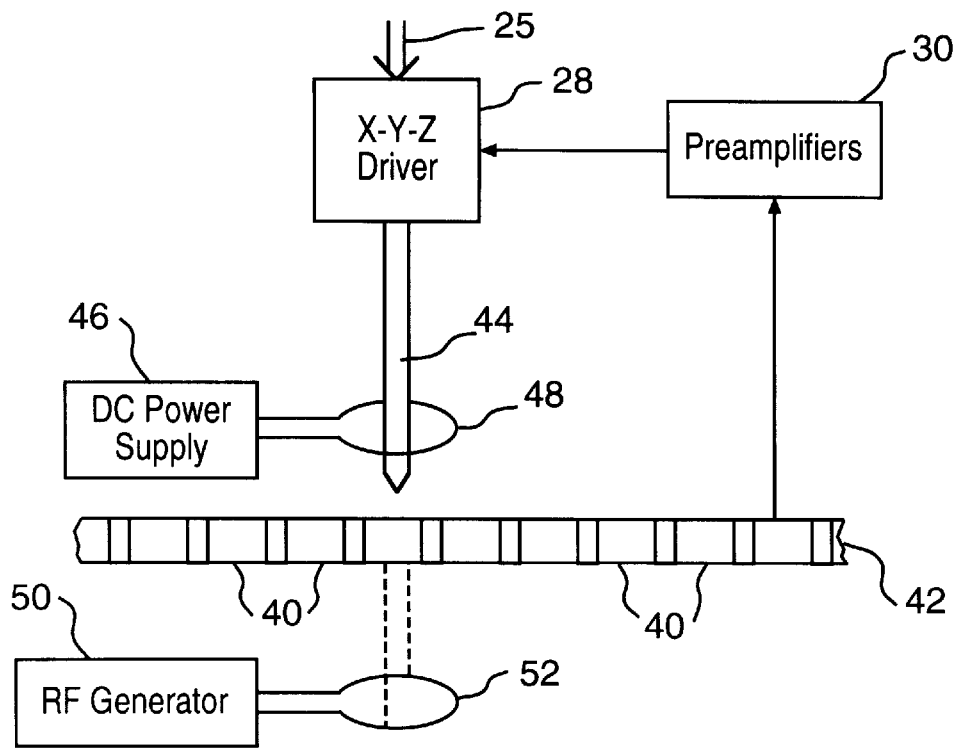
FIG. 3 illustrates another single probe writing embodiment constructed according to the teachings of the present invention in which a radio frequency magnetic field is used to help switch the magnetic orientation of a bit cell.

In FIG. 3, another embodiment of the present invention is illustrated. The device of FIG. 3 utilizes magnetic resonance phenomena to switch the magnetization of selected bit cells 40 formed within the medium 42. A permanently magnetized probe 44 has a probe field associated therewith and is controlled by x-y-z-driver 28 which itself is responsive to control signals 25. A feedback loop including preamplifiers 30 is provided, as in the other embodiments, to help control the position of the probe 44 with respect to the medium 42. A power supply 46 and a loop of wire 48 are used to establish a global static magnetic field, at least in the area of the bit cell 40 to be written. Other methods of establishing such a global static magnetic field could also be used. A radio frequency generator 50 and a loop of wire 52 are used to establish a global radio frequency field, at least in the area of the bit cell 40 to be written. Other methods of establishing such a global radio frequency field, such as using a microwave microstrip transmission line, could also be used. The embodiment of the invention illustrated in FIG. 3 utilizes a radio frequency field applied globally to the medium, a static magnetic field applied globally to the medium, and a localized magnetic field from the permanently magnetized probe head 44. The radio frequency field may be used to excite the resonance phenomenon; the field from the probe head may be used to select the bit to be addressed; and the globally applied static magnetic field may be changed between two levels to control whether the bit cell selected by the probe ends up with its magnetization up or down after the process.

In one embodiment of this invention, the frequency of the radio frequency field is kept constant and the globally applied DC magnetic field $H_a$ is changed in magnitude from $-H_p+\Delta H$ to $-H_p-\Delta H$ where $H_p$ is the field produced by the probe head. In that embodiment, the net applied DC magnetic field ($H_a+H_p$) on a selected bit cell is switched from $+\Delta H$ to $-\Delta H$. By properly selecting the radio frequency, it will then be possible to have switching in the bit cell only when the net of the applied DC fields is antiparallel to the initial magnetization. When the magnetization is parallel to the net DC field or when there is no field from the probe head, switching will not occur because the switching condition will not be fulfilled.

Figure 4A:
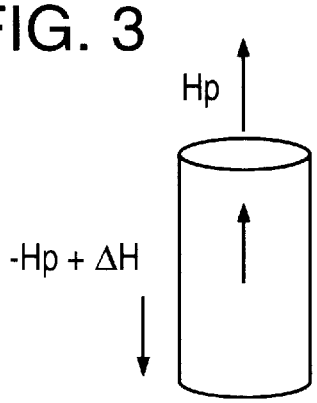
FIGS. 4a through 4d illustrate the addition of the vectors representative of the fields generated in the embodiment shown in FIG. 3.
Figure 4B:
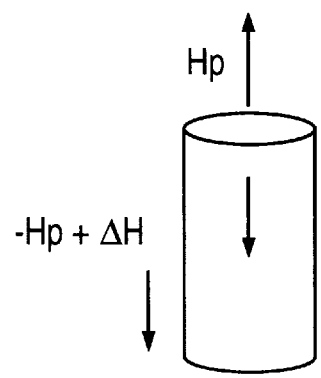

For example, in FIG. 4a, if the magnetization in the bit cell is initially pointed upward (taken as the positive field direction) and the global DC magnetic field is set to $-H_p+\Delta H$, the net magnetic field at the selected bit location will be $+\Delta H$. Switching will not occur in the bit cell, because the net DC magnetic field is parallel to the magnetization and the switching condition is not fulfilled. On the other hand, in FIG. 4b, if the magnetization were initially downward (in the negative direction), the net DC magnetic field would be equal to $+\Delta H$ and antiparallel to the magnetization of the cell, fulfilling the switching condition. Hence, the magnetization in the bit cell would switch to the upward or positive direction. Thus, regardless of the initial state of the magnetization in the bit, it would end up in the positive direction as a result of the application of the global magnetic field $-H_p+\Delta H$.

Figure 4C:
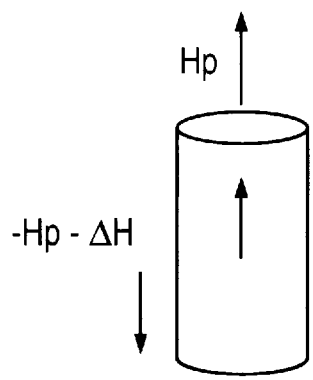
Figure 4D:
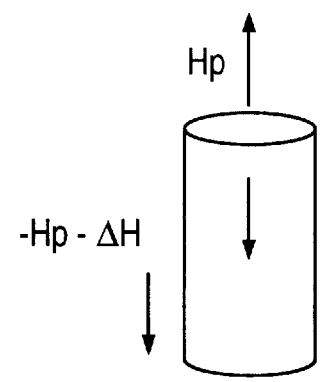

Now consider the case where the global DC magnetic field $H_a$ is set to $-H_p-\Delta H$ so that the net magnetic field under the probe head changes sign and becomes $-\Delta H$. In that case, if the magnetization in the bit cell is upward (or positive) as shown in FIG. 4c, the net DC magnetic field is antiparallel to the magnetization of the cell, the switching condition is fulfilled, and the magnetization of the cell will be switched to the downward (or negative) direction. If, on the other hand, the magnetization is initially downward (negative) as shown in FIG. 4d, the magnetization of the bit cell will be parallel to the net applied DC magnetic field and the switching condition will not be fulfilled. Hence, no switching of the magnetization will take place and the magnetization again ends up in the downward or negative direction. It can be seen that simply by switching the global DC magnetic field between two different levels it is possible to control the final direction of magnetization in the selected bit.

Figure 5:
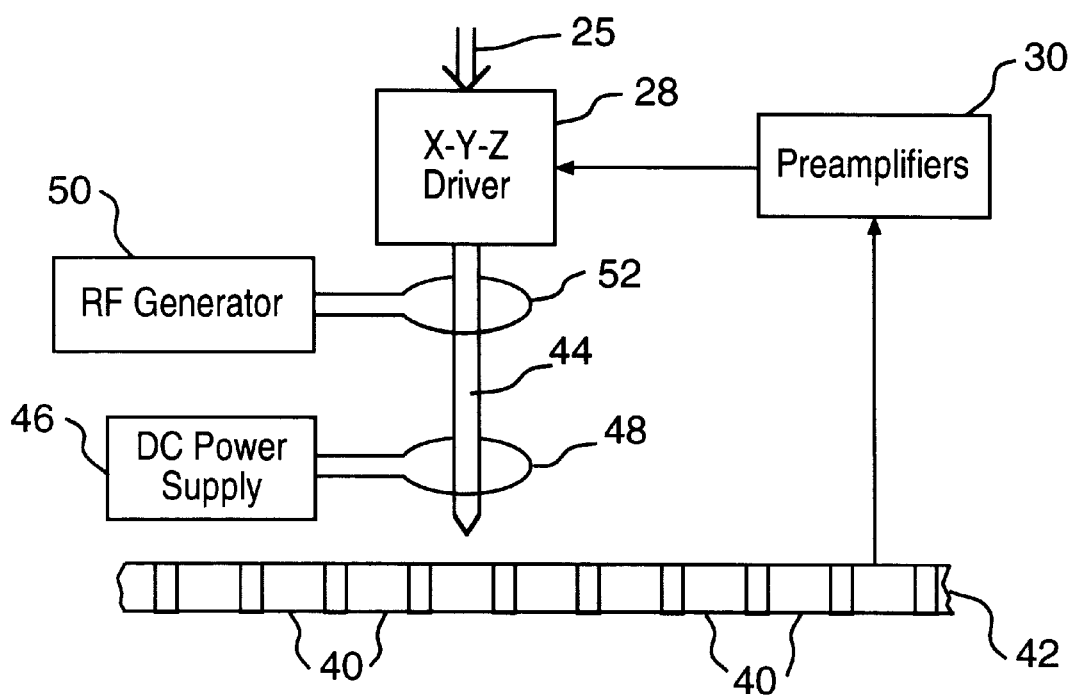
FIG. 5 illustrates another single probe writing embodiment constructed according to the teachings of the present invention in which a radio frequency magnetic field is used to help switch the magnetic orientation of the probe.

Rather than causing the magnetization in the medium to switch, it is alternatively possible to use resonance to cause the magnetization in the probe head 44 to switch. One change required, as shown in FIG. 5, is to position the radio frequency field where it can influence the magnetization state of the probe 44. The DC field is supplied at either $+\Delta H$ or $-\Delta H$, and the energy from the radio frequency field is used to cause switching when the probe field is antiparallel to the applied DC field. That makes it possible to directly write on the medium with the probe head after it has been switched.

Those of ordinary skill in the art will recognize that the embodiments disclosed herein are for writing and that another mechanism must be provided for the read operation.

While the present invention has been described in connection with various embodiments thereof, those of ordinary skill in the art will recognize that other changes and variations are possible without departing from the spirit and scope of the present invention. All such modifications and variations are intended to be included in the foregoing description and the following claims.

What is claimed is:

1. A device for writing information to an area of an erasable magnetic medium, comprising:

a magnetized probe generating a magnetic probe field and having a tip for writing information and said tip being positioned to write information to the medium;

means for providing a static magnetic field at least in the area of the medium to be written, said static magnetic field being oriented in accordance with information to be written to said medium; and means for providing a radio frequency field at least in the area of the medium to be written at a selected frequency such that the combination of said probe field, said static field, and said radio frequency field allows information to be written to the medium.

2. The device of claim 1 wherein the medium includes a medium constructed of a ferromagnetic material.

3. The device of claim 1 wherein the medium includes a medium constructed of a ferrimagnetic material.

4. The device of claim 1 wherein said means for providing a static magnetic field includes a power supply and a wire loop.

5. The device of claim 1 wherein said means for providing a radio frequency field includes a radio frequency generator and a wire loop.

6. The device of claim 1 wherein said means for providing a radio frequency field includes a microwave micro strip transmission line.

7. The device of claim 1 wherein said means for providing a radio frequency field includes means for providing a constant radio frequency field and wherein said means for providing a static magnetic field includes means for providing a static field of varying magnitude.

8. The device of claim 7 wherein, said means for providing a static magnetic field of varying magnitude provides static field having a magnitude variable between $-H_p+\Delta H$ and $-H_p-\Delta H$ where Hp represents the magnitude of the magnetic probe field.

9. A micromachined device comprising:
a magnetized probe generating a magnetic probe field and having a tip for writing information;
means for providing a static magnetic field in the area of said probe in accordance with the information to be written using said tip;
means for providing a radio frequency field in the area of said probe at a selected frequency such that the combination of said static field and said radio frequency field allow said magnetic probe field to align with said static magnetic field when information is to be written using said tip.

10. The device of claim 9 wherein the medium includes a medium constructed of a ferromagnetic material.

11. The device of claim 9 wherein the medium includes a medium constructed of a ferrimagnetic material.

12. The device of claim 9 wherein said means for providing a static magnetic field includes a power supply and a wire loop.

13. The device of claim 1 wherein said means for providing a radio frequency field includes a radio frequency generator and a wire loop.

14. The device of claim 9 wherein said means for providing a radio frequency field includes means for providing a constant radio frequency field and wherein said means for providing a static magnetic field includes means for providing a static field of varying magnitude.

15. The device of claim 14 wherein said means for providing a static magnetic field of varying magnitude provides a static field having a magnitude variable between $-H_p+\Delta H$ and $-Hp-\Delta H$ where Hp represents the magnitude of the magnetic probe field.

16. A method of writing information to an area of an erasable magnetic medium, comprising the steps of:
positioning a magnetized probe generating a probe field with respect to the erasable magnetic medium;
applying a static magnetic field at least in the area of the medium to be written, said static magnetic field being oriented in accordance with the information to be written to said medium; and
applying a radio frequency field at least in the area of the medium to be written at a selected frequency such that the combination of the probe field, static field, and the radio frequency field allow the information to be written to the medium.

17. The method of claim 16 wherein said step of applying a radio frequency field includes the step of applying a radio frequency field of constant amplitude and wherein said step of providing a static magnetic field includes the step of applying a static field of variable magnitude.

18. The method of claim 17 wherein said step of providing a static field of variable magnitude includes the step of providing a static field having a magnitude variable between $-Hp+\Delta H$ and $-Hp-\Delta H$ where Hp represents the magnitude of the magnetic probe field.

* * * * *

UNITED STATES PATENT AND TRADEMARK OFFICE
CERTIFICATE OF CORRECTION

PATENT NO. : 6,011,664 Page 1 of 1
APPLICATION NO. : 08/521972
DATED : January 4, 2000
INVENTOR(S) : Kryder et al.

It is certified that error appears in the above-identified patent and that said Letters Patent is hereby corrected as shown below:

Col. 8, Claim 13, line 1, delete "1" and substitute therefor --9--.

Signed and Sealed this

Twenty-fifth Day of December, 2007

JON W. DUDAS
*Director of the United States Patent and Trademark Office*